(12) United States Patent
Holt et al.

(10) Patent No.: US 8,875,683 B2
(45) Date of Patent: Nov. 4, 2014

(54) TWO-PHASE SPRING

(75) Inventors: Jason D. Holt, St. Charles, IL (US);
Robert R. Schaser, Hampshire, IL (US);
Jeremy R. D. Tuttle, Dearborn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 278 days.

(21) Appl. No.: 13/381,252

(22) PCT Filed: Jun. 9, 2010

(86) PCT No.: PCT/US2010/037881
§ 371 (c)(1),
(2), (4) Date: Dec. 28, 2011

(87) PCT Pub. No.: WO2011/008369
PCT Pub. Date: Jan. 20, 2011

(65) Prior Publication Data
US 2012/0104120 A1    May 3, 2012

Related U.S. Application Data

(60) Provisional application No. 61/221,232, filed on Jun. 29, 2009.

(51) Int. Cl.
*F16F 1/32* (2006.01)
*F16F 1/34* (2006.01)
*F02M 61/16* (2006.01)
*F02M 61/14* (2006.01)

(52) U.S. Cl.
CPC . *F16F 1/328* (2013.01); *F16F 1/32* (2013.01);
*F02M 61/14* (2013.01); *F16F 1/34* (2013.01);
*F02M 61/166* (2013.01)
USPC .......................................................... 123/470

(58) Field of Classification Search
CPC ............... F16F 1/328; F16F 1/32; F16F 1/34;
F02M 61/14; F02M 16/166
USPC .................. 123/470, 468, 469, 467; 239/600;
267/180, 161, 162, 166, 286, 47;
277/559, 361
See application file for complete search history.

(56) References Cited

U.S. PATENT DOCUMENTS

| | | | | |
|---|---|---|---|---|
| 3,038,456 | A * | 6/1962 | Dreisin ......................... | 123/470 |
| 4,528,959 | A * | 7/1985 | Hauser, Jr. .................... | 123/470 |
| 5,558,393 | A * | 9/1996 | Hawkins et al. .............. | 267/162 |
| 5,639,074 | A * | 6/1997 | Greenhill et al. ............. | 267/162 |

(Continued)

FOREIGN PATENT DOCUMENTS

| | | |
|---|---|---|
| DE | 10330557 A1 | 2/2005 |
| DE | 102004022619 A1 | 12/2005 |
| GB | 2389161 A | 12/2003 |
| GB | 2436729 A | 10/2007 |

OTHER PUBLICATIONS

ISR for PCT/US2010/037881 dated Nov. 2, 2010.

*Primary Examiner* — Mahmoud Gimie
(74) *Attorney, Agent, or Firm* — Paul F. Donovan

(57) ABSTRACT

An annular two-phase spring has a plurality of first waves providing a first spring rate and a plurality of second waves providing a second spring rate. The two-phase spring can be used for installing a fuel injector in a fuel injector bore to improve sound performance.

13 Claims, 6 Drawing Sheets

(56) References Cited

U.S. PATENT DOCUMENTS

| | | | |
|---|---|---|---|
| 6,068,250 A * | 5/2000 | Hawkins et al. | 267/162 |
| 6,669,184 B2 | 12/2003 | Cai et al. | |
| 7,334,784 B2 | 2/2008 | Kobelev et al. | |
| 7,373,925 B2 * | 5/2008 | Reiter et al. | 123/470 |
| 7,793,923 B2 | 9/2010 | Suzuki | |
| 8,454,290 B2 * | 6/2013 | Schaser et al. | 411/544 |
| 2003/0222385 A1 * | 12/2003 | Cai et al. | 267/162 |
| 2005/0093216 A1 * | 5/2005 | Kobelev et al. | 267/161 |
| 2007/0047858 A1 * | 3/2007 | Hurley et al. | 384/106 |
| 2007/0175451 A1 * | 8/2007 | Beardmore | 123/470 |
| 2007/0182102 A1 * | 8/2007 | Mormile et al. | 277/361 |
| 2008/0265520 A1 * | 10/2008 | Kurth | 277/549 |
| 2008/0277009 A1 * | 11/2008 | Sprague | 138/38 |
| 2009/0050113 A1 * | 2/2009 | Liskow | 123/470 |
| 2009/0071445 A1 * | 3/2009 | Mueller et al. | 123/470 |
| 2011/0247591 A1 * | 10/2011 | Holt et al. | 123/470 |

* cited by examiner

TWO-PHASE SPRING

CROSS-REFERENCE TO RELATED APPLICATIONS

The present application is national phase of PCT/US2010/037881 filed Jun. 9, 2010, and claims the benefits of U.S. Provisional Application Ser. No. 61/221,232, filed Jun. 29, 2009.

FIELD OF THE INVENTION

The present invention relates generally to springs, and, more particularly, to a two-phase spring that provides two different spring rates from a single spring component. Still more specifically, the invention pertains to a two-phase spring washer suitable for use with a high-pressure fuel injector to provide a softer spring at low pressure for better sound control and a stiffer spring at high pressure.

BACKGROUND OF THE INVENTION

It is known to install fuel injectors in an injector bore of an engine head using a C-clip and an alignment ring in a substantially rigid assembly. The C-clip captures the alignment ring to the fuel injector. It is known for the C-clip to be a split ring fitted over a bump on the fuel injector body to retain the alignment ring on the fuel injector. The alignment ring includes an angled surface that cooperates with an angled surface on the fuel injector to keep the injector in a vertical position within the injector bore, which in turn helps to ensure that a seal at the injector tip works properly. The C-clip outer edge interferes with the inner edge of the alignment ring, and the inner edge of the C-clip interferes with a protrusion on the fuel injector body. The C-clip provides a rigid installation system of the C-clip, the alignment ring and the injector the injector bore of the engine head.

C-clip and alignment ring installations of fuel injectors have worked well from a fuel system performance perspective; however, the installations are not without disadvantages. The rigid alignment allows no movement over the entire engine load range, which results in poor sound performance at engine idle conditions. Allowing slight movement under idle or low load conditions can improve sound performance. However, it is desirable for more limited movement at high load engine operating conditions for injector tip seal performance.

Accordingly, it is desirable to provide a two-phase spring useful for installing a high-pressure fuel injector in an engine to provide limited, controlled movement of the injector at low engine speeds with stiffer performance of the spring at high engine speeds.

SUMMARY OF THE INVENTION

An annular two-phase spring washer is provided, having a first spring rate upon initial deflection of the annular spring and a second spring rate upon further deflection of the annular spring. The spring can be placed beneath an alignment ring in a fuel injector system, and is self-captured on the injector through interference of the annular spring body on the injector.

In a form thereof, a two-phase spring is provided with an annular body of an undulating configuration, a first plurality of first waves in the body having a first wave height providing a first spring rate against flattening and a second plurality of second waves in the body having a second wave height providing a second spring rate resisting flattening different from the first wave height and the first spring rate.

In another form, a multiple phase spring is provided with an annular body, a first plurality of waves in the body having a first spring rate against flattening, and a second plurality of waves in the body having a second spring rate resisting flattening different from the first spring rate.

In still another form disclosed herein, a fuel injector installation is provided with an engine head having a fuel injector bore, including a shoulder; a fuel injector disposed in the fuel injector bore; and a two-phase spring providing an interface between the shoulder and the fuel injector.

An advantage of a form of a two-phase spring is providing an easily manufactured spring having different spring rates under different conditions.

Another advantage of a foam of a two-phase spring is providing a spring suitable for retaining an alignment ring on a fuel injector and providing limited controlled movement of the fuel injector in a fuel injector bore.

Still another advantage of a form of a two-phase spring is providing a spring suitable for mounting a high-pressure fuel injector to reduce noise characteristics.

Other features and advantages of the invention will become apparent to those skilled in the art upon review of the following detailed description, claims and drawings in which like numerals are used to designate like features.

Figure 1:
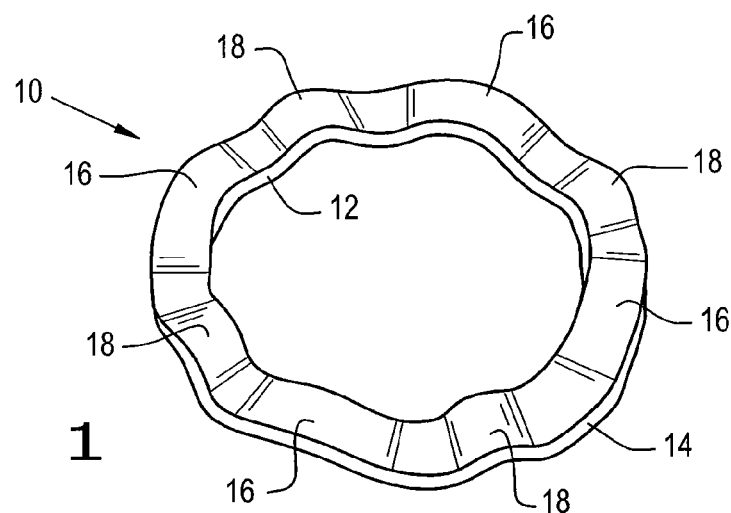
FIG. 1 is a perspective view of a two-phase spring as disclosed herein.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
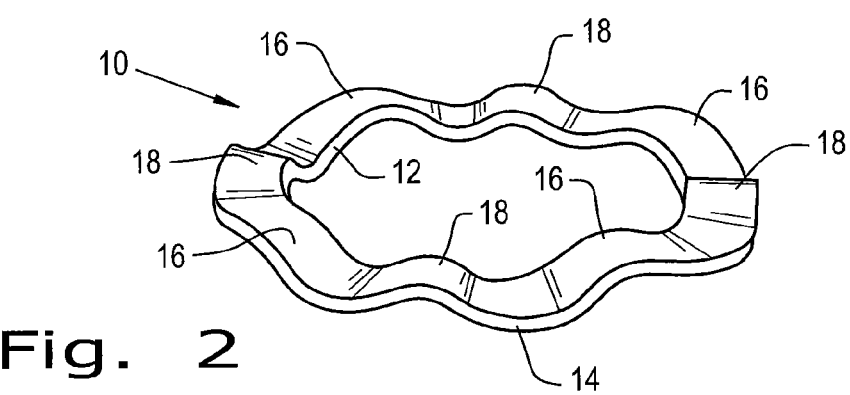
FIG. 2 is a further perspective view of the two-phase spring shown from a different angle.
Figure 3:
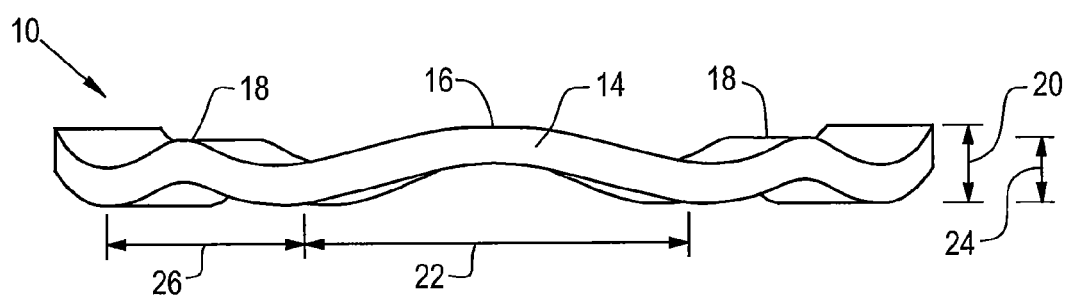
FIG. 3 is an elevational view of the two-phase spring.

Referring now to the drawings more specifically and to FIGS. 1-3 in particular, a two-phase spring 10 is shown. In a preferred embodiment for two-phase spring 10, the spring is a substantially annular body made of steel and can be formed in a stamping process. Many materials are suitable, depending on use. For example and not limitation, a 17-7 stainless steel is a suitable material for a two-phase spring 10 to be used in a fuel injector installation when the fuel injector body is stainless steel. In such an installation, use of the aforementioned stainless steel for spring 10 avoids corrosion issues over time. Carbon steel also can be used with a proper coating to inhibit corrosion problems. It should be understood that two-phase spring 10 can be used for other purposes and in installations other than fuel injector installations. Materials suitable for two-phase spring 10 can be selected for the environment and application in which the spring will function and may be selected from metals, plastics or other materials for such other installations.

Two-phase spring 10 is an annular, undulating spring washer type body having an inner edge 12 and an outer edge 14. The generally undulating configuration of spring 10 includes a first plurality of first waves 16 and a second plurality of second waves 18. In the exemplary embodiment shown and described herein, first waves 16 and second waves 18 are arranged alternating with one another in two-phase spring 10 such that each first wave 16 is separated from a next adjacent first wave 16 by a second wave 18, and each second wave 18 is separated from the next adjacent second wave 18 by a first wave 16. However, it should be understood that other arrangements for first waves 16 and second waves 18 also can be used if appropriate for a particular application and use of the two-phase spring.

First waves 16 have a first wave height 20 and a first wavelength 22. Second waves 18 have a second wave height 24 and a second wavelength 26. First wave height 20 is greater than second wave height 24, and first wavelength 22 is greater than second wavelength 26. Accordingly, first waves 16 provide a first spring rate that is less than a second spring rate provided by second waves 18. Expressed differently, first waves 16 provide a softer spring performance than the spring performance of second waves 18. Second waves 18 are stiffer than first waves 16. Two-phase spring 10 provides two distinctly different spring rates to provide isolation at low loads and limited movement at high loads. The larger, "softer" first waves 16 are the first to be loaded from force applied against the faces of spring 10. Upon further compression of spring 10, the shorter "stiffer" second waves 18 are contacted so that the effective spring rate is the combined performance of first waves 16 and second waves 18.

Figure 4:
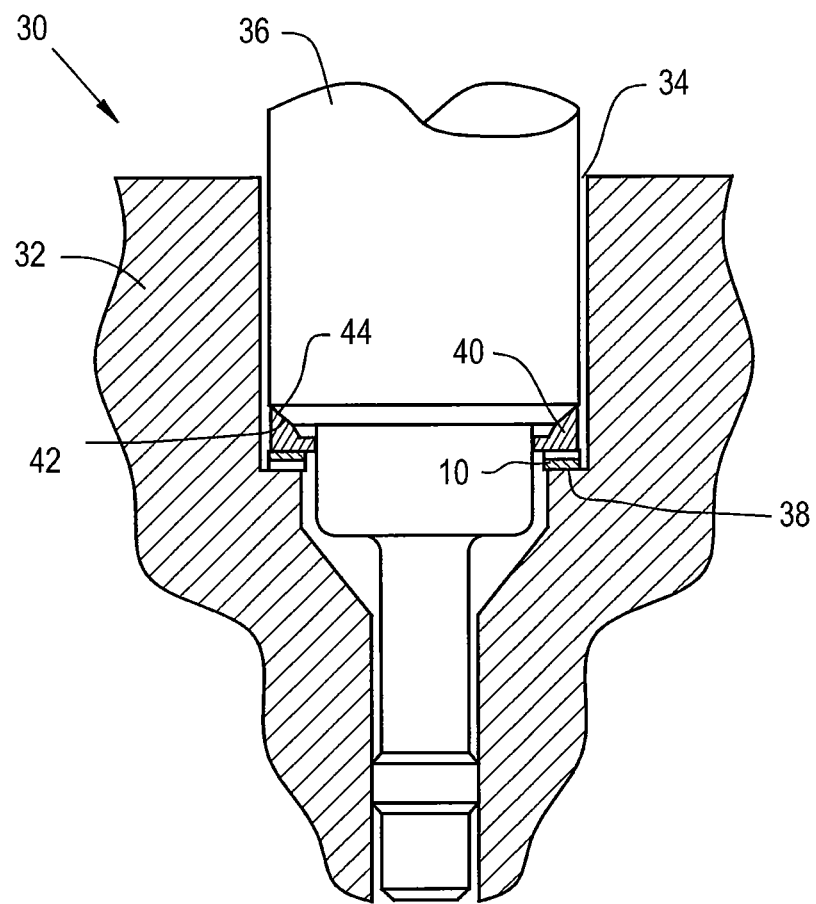
FIG. 4 is a cross-sectional view of a fuel injector installation in an engine using a two-phase spring as disclosed herein.

FIG. 4 illustrates the installation of two-phase spring 10 in an engine 30 having an engine head 32 defining a fuel injector bore 34 with a fuel injector 36 installed therein. A shoulder 38 is provided in bore 34. Two-phase spring 10 functions with an alignment ring 40 having an angled surface 42 cooperating with an angled surface 44 of fuel injector 36 to properly position fuel injector 36 with respect to fuel injector bore 34. The assembly of two-phase spring 10, alignment ring 40 and fuel injector 36 is supported on shoulder 38, with spring 10 providing two distinctly different spring rates as an interface between shoulder 38 and fuel injector 36. Two-phase spring 10 provides isolation of fuel injector 36 at low loads and more limited movement of fuel injector 36 at high loads.

Two-phase spring 10 described herein establishes an initial height datum as installed while allowing limited movement between the light and stiff spring performance positions. In a fuel injector installation, the overall movement once loaded to engine idle conditions typically will not exceed about 50μ (0.050 mm) while providing a lighter spring rate at idle loading to improve sound and vibration performance over known rigid systems. The two-phase spring also provides stiffer resistance when the engine moves past idle so as to eliminate excessive movement. The two-phase spring can be press-fit over the injector body in place of known C-clips to operate in cooperation with the alignment ring to establish vertical positioning of the fuel injector.

Figure 7:
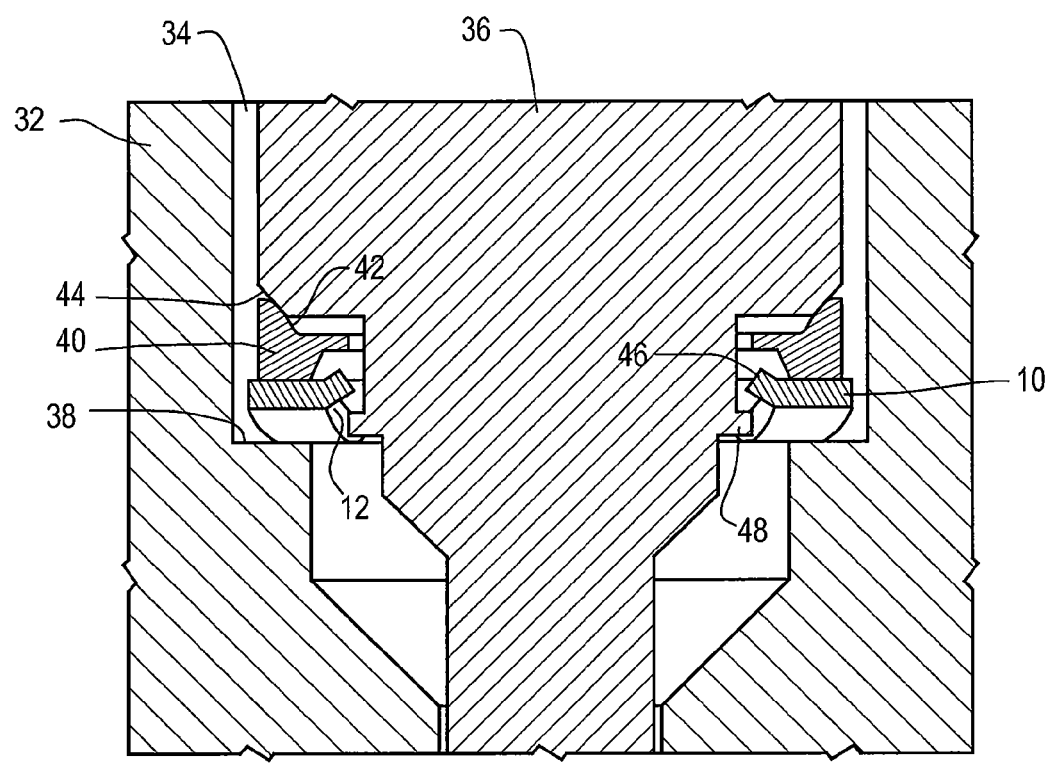
FIG. 7 is a cross-sectional view of a fuel injector installed with a two-phase spring as disclosed herein.

FIG. 7 illustrates one configuration in which slight inward protrusions 46 from inner edge 12 of two-phase spring 10 provide an interference fit with protrusions 48 from fuel injector 36. Accordingly, press-fitting two-phase spring 10 over protrusions 48 of injector 36 secures alignment ring 40 on fuel injector 36. Two-phase spring 10 provides dual functions of spring-like resiliency and securing the alignment ring in place. Accordingly, a separate C-clip is not required for securing the alignment ring on the fuel injector.

Figure 5:
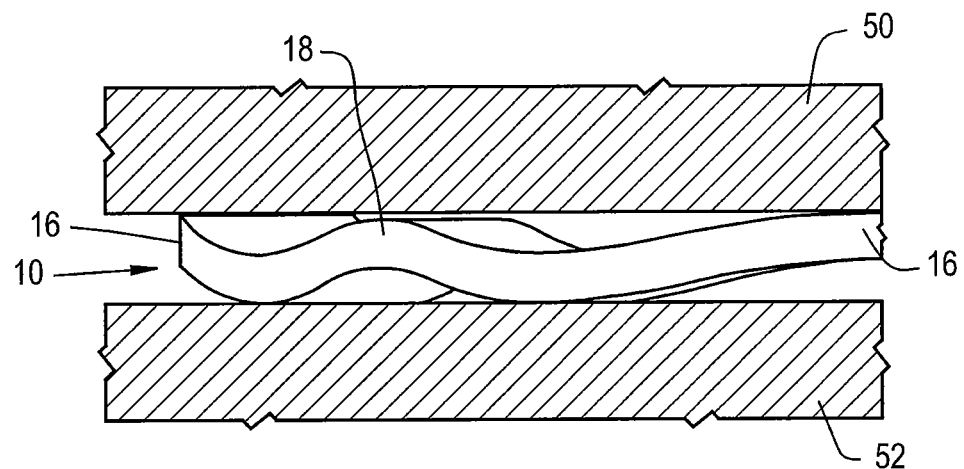
FIG. 5 is an enlarged cross-sectional view of an installed two phrase spring under a first load condition.
Figure 6:
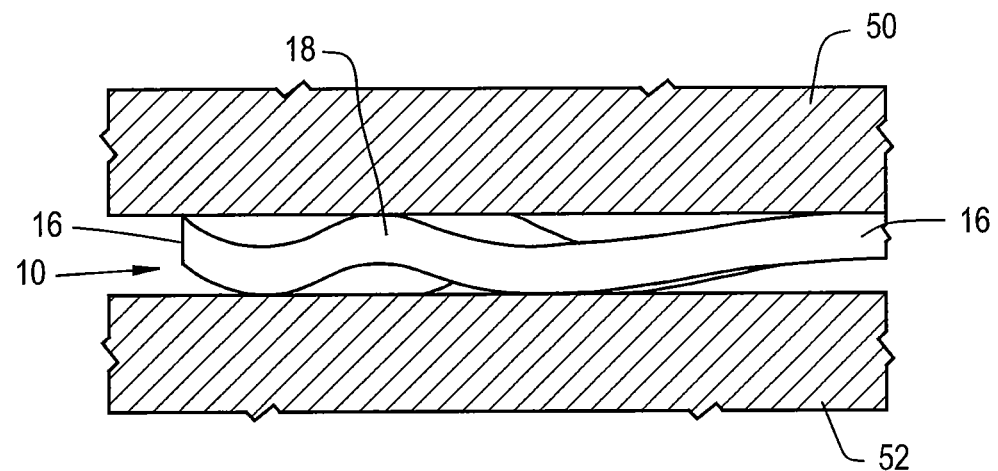
FIG. 6 is an enlarged cross-sectional view similar to that of FIG. 5, but illustrating the installed two-phase spring under a second load condition.

FIGS. 5 & 6 illustrate a two-phase spring 10 in operation between a first component 50, which may be, for example, the aforedescribed alignment ring 40; and a second component 52, which may be, for example, the aforedescribed shoulder 38 of engine head 32. Two-phase spring 10 is an active part of the system. When the system is at low pressure (such as engine idle for a fuel injector installation); there is a low amount of force applied against spring 10. At this low force, the spring is compressed only minimally, and remains in the light spring rate range, with only the first plurality of first waves 16 in contact with first component 50 and second component 52. As shown in FIG. 5, second waves 18 are spaced from first component 50, and thereby do not offer resistance to relative movement between first and second components 50, 52. When the system is at high pressure (such as engine rev-up for a fuel injector installation) the force that two-phase spring 10 experiences is increased (by up to five or six times that experienced at engine idle in a fuel injector installation). When the system goes to sufficiently higher loads, two-phase spring 10 deflects an additional distance until both of the pluralities of first waves 16 and second waves 18 are in contact with the opposing first and second components 50, 52. With all of first waves and second waves 18 in contact with first and second components 50, 52, a stiffer spring rate is applied to limit system movement. As shown in FIG. 6, second waves 18 are in contact with first component 50 along with first waves 16. Accordingly, an abrupt increase in spring resistance is experienced to resist further deflection beyond that shown in FIG. 6.

When the system returns to a lower pressure from the higher pressure, (such as when an engine returns to idle in an installation of the two-phase spring for a fuel injector) spring 10 will relax to the low load state as shown in FIG. 5, in which only the plurality of first waves 16 are in contact with the opposing first and second components 50, 52.

The difference between first wave height 20 and second wave height 24 determines the amount of deflection required to transition from the first, lighter spring performance as shown in FIG. 5, with only first waves 16 in contact between first and second components 50, 52; and the second, stiffer spring performance as shown in FIG. 6, with first waves 16 and second waves 18 in contact between first and second components 50, 52. The timing of spring rate change from a light to a stiff spring rate, and from the stiff spring rate back to light spring rate can be controlled thereby.

Figure 8:
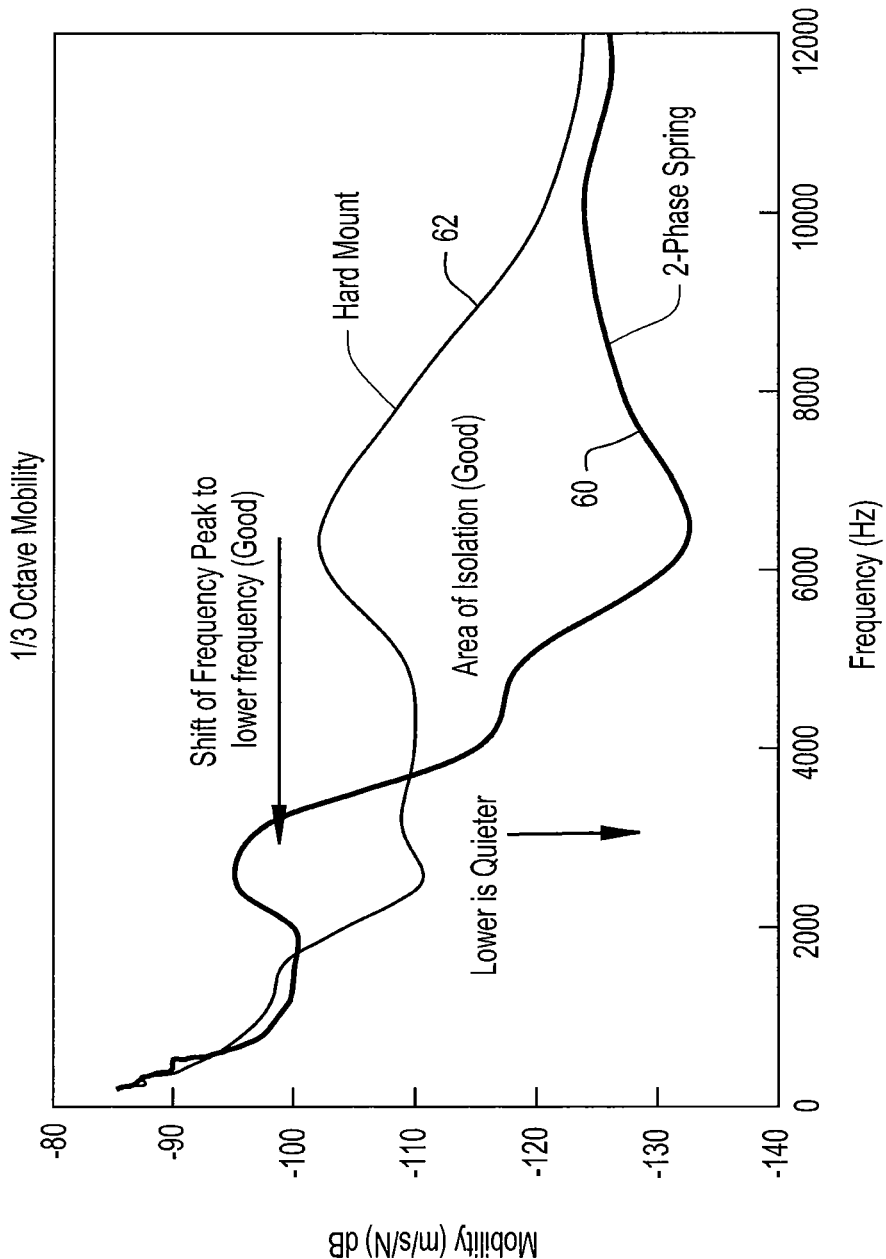
FIG. 8 is a graph of sound performance characteristics of a rigidly installed fuel injector system and a fuel injector installed with the two-phase spring as disclosed herein.

FIG. 8 illustrates a sample noise and vibration test comparing test results for a prototype two-phase spring as described herein, shown as graph line 60, to test results for a known a rigid design, shown as graph line 62. On the graph of FIG. 8, a lower graph position designates that less energy is transferred to the engine head and, therefore, less noise, resulting in a quieter system. This plot illustrates that the two-phase spring described herein results in a quieter system.

As can be appreciated, noise and vibration are undesirable from the perspective of a vehicle occupant. Generally, lower mobility provides quieter results. As the test results illustrate, for a frequency range below about 4000 Hz, the prior rigid design is not necessarily unacceptable; however, lower frequency range peaks as obtained from the two-phase spring results can be more easily masked with sound treatment. Frequency peaks at higher frequencies are more difficult to cover or mask. Shifting the peak to a lower frequency is beneficial in that the area of isolation begins sooner. From 4000 Hz and beyond, a two-phase spring as described herein offers a significant improvement over the entire frequency range. The two phase spring as described herein has a lower average across the range. Accordingly, it can be seen that the two-phase spring promotes isolation and improved sound performance.

Figure 9:
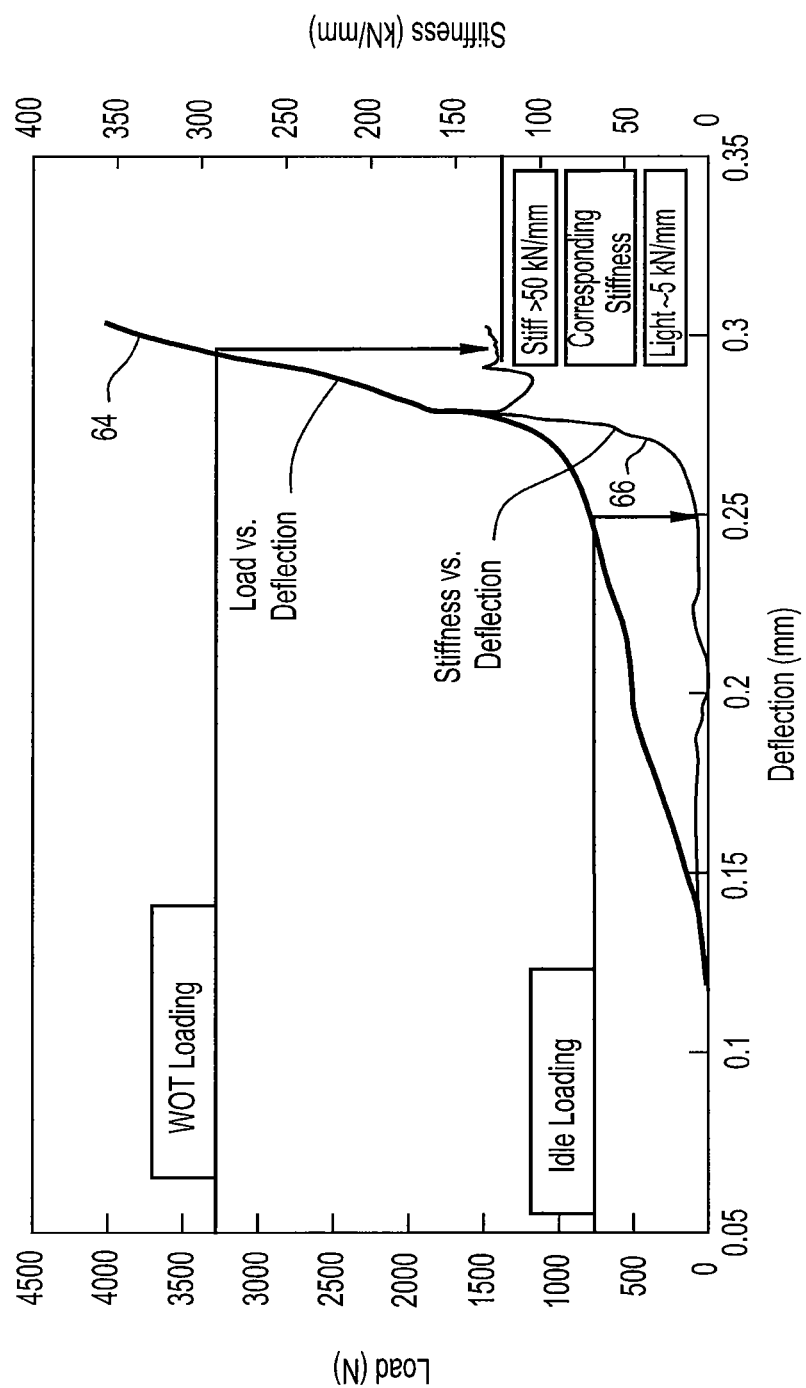
FIG. 9 is a graph of a two-phase spring performance.

FIG. 9 illustrates a spring rate plot for a two-phase spring as described herein. The graph illustrates that the spring rate has a dramatic transition from light to stiff at the moment all of the waves of the spring come into contact with mating members. FIG. 9 shows the same part plotted on two different axes showing load and stiffness. Graph line 64 is a graph of load versus deflection, and graph line 66 shows stiffness versus deflection. The graph shows a sharp increase in stiffness. The two-phase spring described herein provides high load, high stiffness performance, and a lower stiffness at low loads. On the graphical information, "WOT" stands for "wide-open throttle," which is the condition under which the spring used for a fuel injector installation would experience the greatest load. The graph illustrates spring performance when the spring experiences high vertical load from above, such as increased pressure in the injector at WOT conditions.

Two-phase spring 10 establishes an effective interface between two components while providing different sparing rates under different conditions.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A two-phase spring, comprising:
  an annular body of an undulating configuration, said body being made of a single material;
  a first plurality of first waves in said body, each first wave having a first wavelength and a first crest defining a first wave height providing a first spring rate against flattening; and
  a second plurality of second waves in said body, each second wave having a second wavelength and a second crest defining a second wave height providing a second spring rate resisting flattening different from said first wave height and said first spring rate;
  wherein each first wave of said first plurality of waves is arranged in an alternating pattern with each second wave of said second plurality of waves, such that each first wavelength is followed by each second wavelength around said annular body.

2. The spring of claim 1, said first wave height being larger than said second wave height, and said first spring rate being less than said second spring rate.

3. The spring of claim 1, waves of said first plurality of waves having a longer wave length than waves of said second plurality of waves.

4. The spring of claim 3, said first wave height being larger than said second wave height.

5. The spring of claim 4, said first wave height being larger than said second wave height, and said first spring rate being less than said second spring rate.

6. A two-phase spring for use in a fuel injector installation, the combination comprising;
  an annular body of an undulating configuration;
  a first plurality of first waves in said body, each first wave having a first wavelength and a first crest defining a first wave height providing a first spring rate against flattening; and
  a second plurality of second waves in said body, each second wave having a second wavelength and a second crest defining a second wave height providing a second spring rate resisting flattening different from said first wave height and said first spring rate;
  wherein each first wave of said first plurality of waves is arranged in an alternating pattern with each second wave of said second plurality of waves, such that each first wavelength is followed by each second wavelength around said annular body;
  an engine head having a fuel injector bore including a shoulder; and
  a fuel injector disposed in said fuel injector bore; wherein said spring provides an interface between said shoulder and said fuel injector.

7. The fuel injector installation of claim 6, said two phase spring being annular and having first and second spring rates.

8. The fuel injector installation of claim 7, said the two-phase spring including a first plurality of first waves having a first spring rate and a second plurality of second waves having a second spring rate.

9. The fuel injector installation of claim 8, said first waves having a taller wave height than said second waves.

10. The fuel injector installation of claim 8, said first waves having a longer wavelength than said second waves.

11. The fuel injector installation of claim 10, said first waves having a taller wave height than said second waves.

12. The fuel injector installation of claim 6, said two-phase spring being annular and forming an interference fit with said fuel injector.

13. The fuel injector installation of claim 12, including an alignment ring held on said fuel injector by said two phase spring.

* * * * *